United States Patent
Fujiwara et al.

(10) Patent No.: US 6,830,848 B1
(45) Date of Patent: Dec. 14, 2004

(54) MOLDED ELECTRODE, METHOD FOR PRODUCTION THEREOF, AND SECONDARY BATTERY USING THEREOF

(75) Inventors: Masaki Fujiwara, Tokyo (JP); Yuji Nakagawa, Tokyo (JP); Masato Kurosaki, Tokyo (JP); Shinako Kaneko, Tokyo (JP); Gaku Harada, Tokyo (JP); Toshihiko Nishiyama, Tokyo (JP)

(73) Assignee: NEC Tokin Corporation, Sendai (JP)

( * ) Notice: Subject to any disclaimer, the term of this patent is extended or adjusted under 35 U.S.C. 154(b) by 22 days.

(21) Appl. No.: 09/689,817

(22) Filed: Oct. 13, 2000

(30) Foreign Application Priority Data

Oct. 14, 1999 (JP) .......................................... 11-292537

(51) Int. Cl.[7] ............................................... H01M 4/60
(52) U.S. Cl. ...................................................... 429/213
(58) Field of Search ................................ 429/212, 213, 429/211; 264/176.1

(56) References Cited

U.S. PATENT DOCUMENTS

| | | | |
|---|---|---|---|
| 4,020,248 A | * | 4/1977 | Goebel .......................... 429/164 |
| 4,695,521 A | | 9/1987 | Shacklette et al. |
| 4,816,359 A | * | 3/1989 | Nagele et al. ............... 429/213 |
| 5,424,151 A | * | 6/1995 | Koksbang et al. |
| 5,637,421 A | * | 6/1997 | Poehler et al. ............... 429/303 |
| 5,656,393 A | * | 8/1997 | Boer et al. .................... 429/217 |
| 6,280,854 B1 | * | 8/2001 | Tasaka et al. |
| 6,299,653 B1 | * | 10/2001 | Hoshi et al. ................ 29/623.1 |
| 6,306,215 B1 | * | 10/2001 | Larkin .......................... 118/249 |
| 2001/0049032 A1 | * | 12/2001 | Gan ................................. 429/9 |

FOREIGN PATENT DOCUMENTS

| | | |
|---|---|---|
| JP | 8-64200 | 3/1996 |
| JP | 10-284050 | 10/1998 |

OTHER PUBLICATIONS

IPDL JPO Machine Translation for JP 08–064200 A (publication date of Mar. 1996).*
British Search Report dated Feb. 19, 2001, for application No. GB 0025172.8.

* cited by examiner

*Primary Examiner*—Susy Tsang-Foster
(74) *Attorney, Agent, or Firm*—McGinn & Gibb, PLLC

(57) ABSTRACT

A molded electrode into one-piece is obtained by hot pressing an electrode material obtained by mixing a polymer active material, a conductivity-enhancing agent and a plasticizer, and a current collector sheet. The electrode structure permits significant freedom when designing a secondary battery which uses this electrode with a high energy density and a high power density.

31 Claims, 3 Drawing Sheets

MOLDED ELECTRODE, METHOD FOR PRODUCTION THEREOF, AND SECONDARY BATTERY USING THEREOF

BACKGROUND OF THE INVENTION (1) Field of the Invention

The present invention relates to a secondary battery using a polymer active material. More particularly, the present invention relates to the composition and structure of an electrode using a polymer active material, as well as to a method for production of the electrode.

(2) Description of the Prior Art

Secondary batteries using a polymer material (e.g. a polyaniline or a polypyrrole) as an active material have been developed. In typical method for producing a electrode in such a secondary battery, a polymer active material, a conductivity-enhancing agent and an organic binder (e.g. a polytetrafluoroethylene) are kneaded using an appropriate solvent to obtain an electrode mixture; this electrode mixture is coated on a current collector (e.g. a metal foil), followed by drying, to form a film (or layer) of ordinarily about 20 to 100 $\mu$m in thickness on the current collector. The resulting electrode is used as a positive electrode and/or a negative electrode; a separator is interposed between the positive electrode and the negative electrode, and a plurality of such combinations are laminated on each other to obtain a laminated type battery, or such a combination is wound to obtain a wound type battery.

In the above production method, however, during the drying of the coating film of electrode mixture formed on the current collector, the solvent contained in the coating film vaporizes, which incurs the contraction of the film and often generates cracks in the film. This phenomenon is more striking when the coating film is formed in a larger thickness; therefore, it is difficult to form a thick film. A large amount of the electrode active material is required in order to allow the produced battery to have a high energy density (i.e. a large energy per battery volume). In the above production method, the volume of the current collector in the battery is inevitably large; therefore, it is difficult to increase the amount of the active material to a level higher than now, within the restraint of limited battery volume. Thus, in the conventional production method, it has been difficult to further enhance the energy density of a battery using a polymer active material.

Conventional batteries have other problems. That is, they use a polyvinylidene fluoride, a polytetrafluoroethylene or the like as the binder. With such a binder, the surface of the polymer active material is covered with the binder and a thin film of the binder is formed on the surface of the current collector. Consequently, the battery has an increased electrical resistance and a decreased power density.

Conventional batteries still have other problems. That is, the electrode of battery has been limited to a sheet type, which limits the freedom of battery designing.

In JP-A-8-64200, it is described that by adding a plasticizer to a polymer active material, the adhesivity of the active material to an electrode substrate is increased, enabling a battery of higher energy density. In JP-A-8-64200, however, since the polymer active material, the plasticizer, etc. are coated in a liquid state to form an electrode member, it is difficult to form the film (or layer) in a large thickness, for the same reason as mentioned previously; therefore, the approach by JP-A-8-64200 is still insufficient with respect to the energy density of battery.

Thus, an electrode structure having a large ratio of electrode active material amount to current collector has been needed, but such an electrode has been unknown.

SUMMARY OF THE INVENTION

In view of the above-mentioned problem of the prior art, the object of the present invention is to provide a secondary battery using a polymer active material, which has a high energy density and a high power density and which permits significant freedom in battery designing. The another object of the present invention is to provide a method for producing a secondary battery of large energy density and large power density in a high freedom for battery designing, using a polymer active material.

Accordingly, the present invention is directed to a molded electrode comprising: (a) an electrode material comprising a polymer active material, a conductivity-enhancing agent and a plasticizer and (b) a current collector sheet; the electrode material and the current collector sheet molded into one piece, and the electrode material being in a thickness of 300 $\mu$m to 9 mm and formed on at least one side of the current collector sheet.

Another aspect of the present invention is directed to a molded electrode comprising: (a) an electrode material comprising a polymer active material, a conductivity-enhancing agent and a plasticizer and (b) a plurality of current collector sheets; the electrode material and the current collector sheets formed into one piece, and the current collector sheets spaced each other in the thickness direction of the electrode.

Yet another aspect of the present invention is directed to a molded electrode comprising: (a) an electrode material comprising a polymer active material, a conductivity-enhancing agent and a plasticizer and (b) at least one current collector sheet; the electrode material and the current collector sheet formed into one piece, and the ratio of the volume of the electrode material and the volume of the current collector sheet being 30:1 to 100:1, provided the volume of the terminal portion of the current collector sheet is excluded from the volume of the current collector sheet. In this case, a plurality of the collectors and the electrode material may be molded into one piece.

Yet another aspect of the present invention is further directed to a method for producing a molded electrode, which comprises a step of: hot pressing (a) an electrode material which is a mixture of a polymer active material, a conductivity-enhancing agent and a plasticizer and (b) at least one current collector sheet.

Yet another aspect of the present invention is further directed to a method for producing a molded electrode, which comprises steps of: (i) hot pressing (a) an electrode material which is a mixture of a polymer active material, a conductivity-enhancing agent and a plasticizer and (b) at least one current collector sheet to form a molded material and (ii) conducting once or more times step of (ii-1) hot pressing the molded material, the same electrode material and a current collector sheet, or/and (ii-2) laminating and hot pressing a plurality of molded materials each produced as above, whereby forming a one-piece molded electrode comprising the electrode material and a plurality of current collector sheets spaced each other in the thickness direction of the electrode.

Figure 1:
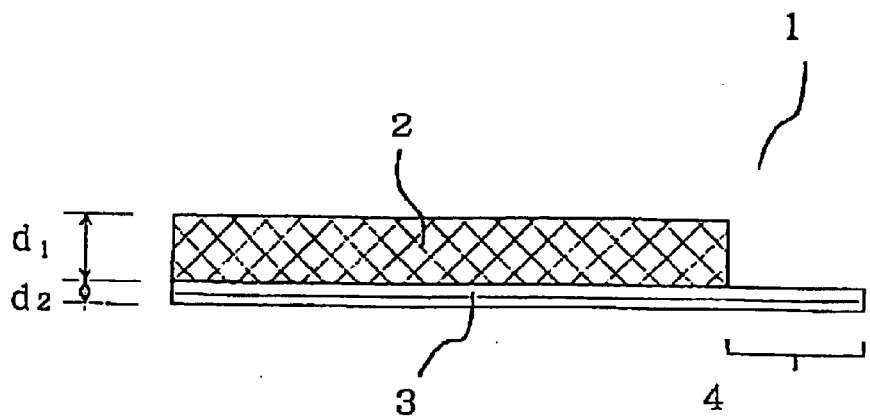
FIG. 1 is a sectional view showing an example of the molded electrode of the present invention.

Explanation of numerals:
1: Molded electrode
2: Electrode material
3: Current collector
4: Terminal
6: Negative electrode (metal lithium)
7: Separator
8: Casing member
9: Nickel current collector
10: Electrode material
11: Molded electrode

DETAILED DESCRIPTION OF THE INVENTION

In a battery using a particular positive electrode active material, a particular negative electrode active material, a particular electrolytic solution, etc., its energy density is affected by the ratio of the electrode material used therein and the density of the electrode material per se.

With respect to the volume ratio of the electrode material used in battery, the molded electrode of the present invention has a large ratio of electrode material to current collector and therefore can provide a secondary battery having a large energy density. That is, since the molded electrode of the present invention contains a plasticizer together with a polymer active material, it can be quite easily molded from a mixed powder and, after molding, has shape retainability; therefore, the electrode material layer in the present molded electrode can be made thicker than in conventional electrodes and, as a result, the present molded electrode has a very large ratio of electrode material to current collector.

With respect to the density of electrode material per se, the present electrode material is used in a molded form and accordingly has a high density; therefore, a battery of high energy density is obtained.

Meanwhile, the power density of battery, which is also an important property of battery like the energy density, is affected mainly by the internal impedance of battery. A smaller internal impedance gives a superior power density.

The molded electrode of the present invention uses no binder used in conventional electrodes. Consequently, in the present molded electrode, there is no formation of an insulating film on the surface of the current collector; the adhesivity between the current collector and the electrode material is high; and the interfacial resistance is very low. Further, since the electrode material is used in a molded form and has a high density, the resistance between active material molecules is also low. For these reasons, the internal impedance of the electrode is small, whereby a battery of high power density is obtained.

The present invention is described in detail below with referring to the accompanying drawings.

FIG. 1 is a sectional view of an example of the molded electrode of the present invention. This example illustrates a molded electrode 1 obtained by molding an electrode material 2 and a current collector sheet 3 into one piece in such a condition that the electrode material 2 contacts with one side of the current collector sheet 3. In the present invention, "the state in which an electrode material and a current collector sheet are molded into one piece" refers to a state in which the polymer active material in an electrode material is melted or softened during the course of molding, causes sticking between the particles, is molded along the die used for molding, and adheres to a current collector sheet to form a one-piece electrode. The molded electrode has such a porosity that the electrode can function as such, for example, a porosity of 20 to 30% in volume, and yet has, by itself, shape retainability similar to plastic molded materials obtained by molding.

Since the present molded electrode has shape retainability by itself, the electrode material used therein can have a thickness ($d_1$) of 300 μm or more, easily 500 μm or more (particularly more than 500 μm), preferably 700 μm or more, particularly preferably 1 mm or more. When the thickness is too large, the distance from the current collector to the electrode material surface as average becomes large, which may, in a embodiment, increase the internal impedance of battery. Therefore, the thickness is ordinarily9 mmor less, preferably 8 mm or less, particularly preferably 7 mm or less. In the most preferred embodiment, the thickness of the electrode material is larger than 0.5 mm but not larger than 4 mm.

As above, in the molded electrode of the present invention, the electrode material can have a large thickness. Therefore, the volume ratio of the electrode material to the current collector can be made large as compared with conventional electrodes using the same current collector, whereby a battery having a higher energy density can be obtained.

If there is no particular restriction in selection of the material for current collector, the thickness ($d_2$) of the current collector is preferably small because, with a smaller current collector thickness, the volume ratio of electrode material to current collector can be made larger. When a very large volume ratio of electrode material to current collector is desired, the current collector thickness ($d_2$) is preferably, for example, 100 μm or less, more preferably 50 μm or less, particularly preferably 30 μm or less. The current collector thickness is preferably as small as possible as long as the required current collector strength is ensured; however, when an ordinary metal is used as the current collector, a current collector having a thickness of about 10 μm or more is used for the availability and other reason. The volume ratio of electrode material to current collector can be made even larger by using a mesh type (holes-containing type) current collector. Use of a mesh type current collector has a further advantage of improved adhesivity between electrode material and current collector. The mesh type current collector, however, has a smaller area for current collection; therefore, selection of a material for current collector need be made by considering various factors.

In the present invention, the thicknesses of the electrode material and the current collector can be set as mentioned above. Therefore, when a very large volume ratio of electrode material to current collector is desired, the ratio can be set at 30:1 to 100:1, further at 30:1 to 80:1, particularly 30:1 to 60:1. The electrode material is not formed on the whole surface of the current collector but, as shown in FIG. 1, is formed ordinarily on the surface part excluding the terminal portion 4 (this portion is generally called a tab). Therefore, in the present invention, in determining the volume ratio of electrode material to current collector, the ratio is calculated by subtracting the volume of the terminal portion 4 from the total volume of the current collector. That is, in determining the volume ratio, only the portion of the current collector functioning as such is taken into consideration.

Figure 2:
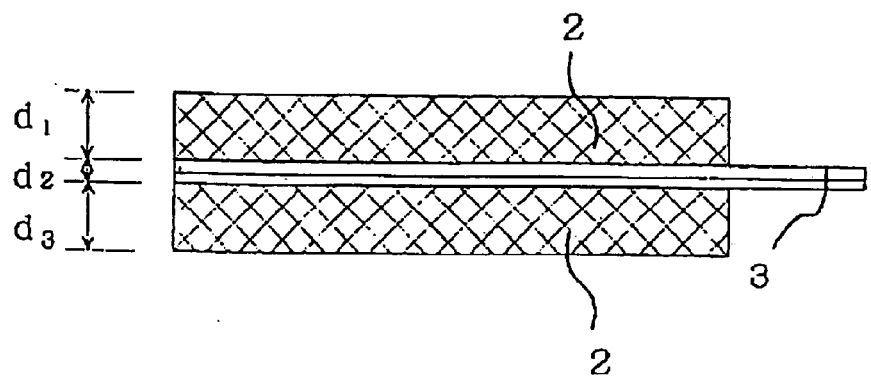
FIG. 2 is a sectional view showing other example of the molded electrode of the present invention.

In the present invention, the mold of the molded electrode can be a one-piece electrode in which an electrode material is provided on the both sides of a current collector sheet, as shown in FIG. 2. In this case, the thickness ($d_3$) of the electrode material on the other side of the current collector can be set at the same level as ($d_1$); however, as long as a desired volume ratio is satisfied, it is possible that ($d_1$) is set in the above-mentioned range and ($d_1$) is set at 300 um or less. Such a one-piece electrode mode in which an electrode material is provided on the both sides of a current collector sheet, is effectively used, for example, when this electrode is placed in the middle and two opposite electrodes are placed so as to surround the former electrode, or when a positive electrode and a negative electrode are laminated.

Figure 3:
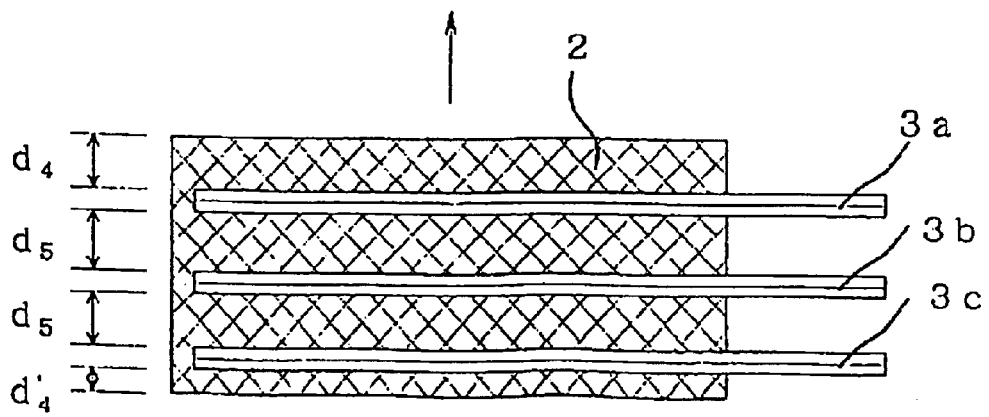
FIG. 3 is a sectional view showing still other example of the molded electrode of the present invention.

FIG. 3 is a sectional view showing still other mode of the molded electrode of the present invention. In the molded electrode of this mode, a plurality of current collector sheets (three sheets in the case of FIG. 3) and an electrode material are molded into a one-piece electrode. Such an electrode structure has hitherto been unknown and is novel. In such a molded electrode using a plurality of current collector sheets, the thicknesses ($d_4$ and $d_4'$) of the outermost electrode material layers, the current collector-to-current collector distances ($d_5$), etc. can be set appropriately. In that case, the current collector-to-current collector distances need not be equal to each other; in the molded electrode of FIG. 3, the distance between the current collector 3a and the current collector 3b may be different from the distance between the current collector 3b and the current collector 3c. The individual current collectors need not be parallel to each other and can be arranged in such a structure that each current collector and the electrode material can take part in a reaction efficiently. That is, a structure in which a plurality of current collector sheets are inserted in the thickness direction of electrode, can be employed as long as the electron conductivity and ion conductivity of electrode do not cancel each other.

In order to obtain a large volume ratio of electrode material to current collector as compared with the volume ratio of the conventional electrode using the same current collector, it can be easily obtained by setting the ($d_4$) and ($d_5$) at, for example, the above-mentioned level of ($d_1$). The ($d_4'$) can be set appropriately so as to match the form of the battery to be produced.

When a very large volume ratio of electrode material to current collector is required, a volume ratio mentioned with respect to the mode of FIG. 1 can be easily achieved by appropriately selecting the thickness of current collector.

In the above molded electrode using a plurality of current collector sheets, when the current collector(s) near to an opposite electrode are a mesh type (a holes-containing type), ion can pass through the mesh and the current collector(s) distant from the opposite electrode can be utilized more efficiently. As shown in FIG. 3, when the molded electrode of the present invention is used as a positive electrode and the current collectors 3a and 3b near to a negative electrode is a mesh type (a holes-containing type), the current collector 3c most distant from the negative electrode can be utilized more efficiently.

Figure 4:
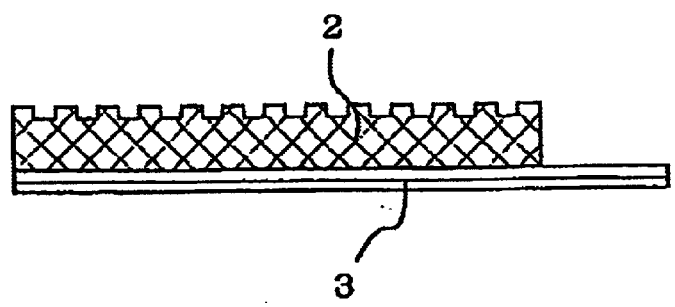
FIG. 4 is a sectional view showing still other example of the molded electrode of the present invention.

In the present invention, the electrode material can have unevenness at the surface. FIG. 4 is an example of the molded electrode of the present invention, having unevenness at the surface. In this example, the surface area is larger than the case having a flat surface. That is, since the molded electrode of the present invention has shape retainability by itself, the shape thereof such as surface condition or the like can be designed relatively freely.

As the current collector used in the present invention, there can be mentioned for example, a processed carbon material (a sheet, a film or a mesh); a conductive butyl rubber containing carbon black by kneading; a processed material (a sheet, a foil or a mesh) of a metal such as nickel, zinc, copper, tin, stainless steel, aluminum, tantalum, niobium, tungsten or titanium; and a film of a conductive polymer such as polyaniline, polythiophene, polypyrrole, polyphenylenevinylene, polyphenylacetylene or polyacetylene. From these materials can be appropriately selected a current collector which causes neither quality change nor embrittlement in the one-piece molding with the electrode material in a hot press and which is neither soluble in nor corroded by an electrolytic solution described later. A metal foil or mesh which is neither soluble nor corroded, is used ordinarily. The current collector may have a roughened surface for higher adhesivity with the electrode material. The roughened surface can be obtained by sandblasting, laser processing or chemical (or electrochemical) etching. As mentioned previously, the current collector may be a mesh type or may have a large number of through-holes by punching.

The polymer active material used in the present invention can be a polymer material capable of conducting an electrochemical oxidation-reduction reaction. Such a polymer material is explained by classifying into the following four groups (i) to (iv) based on the functions.

(i) The first type is a polymer capable of conducting an oxidation-reduction reaction by doping/dedoping of anion and doing/dedoping of proton. There can be mentioned, for example, polymers of aniline or an aniline derivative and polymers of indole or an indole derivative.

As the aniline derivative, there can be mentioned, for example, biphenylaniline, 3-methylaniline, 3,5-dimethylaniline, 3-ethylaniline, 3-n-propylaniline, 3-methoxyaniline, 3-ethoxyaniline, 3,5-dimethoxyaniline, 3,5-diethoxyaniline, 3-phenylaniline, 4-phenylaniline, 3,5-diphenylaniline, 3-naphthylaniline, 3-toluylaniline, 2,5-dimethylaniline, o-phenylenediamine, o-aminobenzenesulfonic acid, o-aminobenzoic acid, aminobenzonitrile, aminobenzophenone, aminoacetophenone, aminoanthracene, p-aminoazobenzene, chloroaniline, fluoroaniline, aminodiphenyl, aminodiphenylamine, aminonitrophenol and aminonitrotoluene. As the indole derivative, there can be mentioned, for example, 5-cyanoindole, 5-nitroindole and 6-nitroindole.

(ii) The second type is a polymer capable of conducting an oxidation-reduction reaction by doping/dedoping of anion and cation. There can be mentioned, for example, polymers of pyrrole or a pyrrole derivative such as N-methylpyrrole, N-ethylpyrrole, N-octylpyrrole or the like.

(iii) The third type is a polymer capable of conducting an oxidation-reduction reaction by doping/dedoping of anion. There can be mentioned, for example, polymers of thiophene or a thiophene derivative such as 3-methylthiophene, 3-ethylthiophene, 3,4-dimethylthiophene, 3,4-diethylthiophene, 2,5-ethylenedioxythiophene, isothionaphthene, 3-thiophene-p- ethanesulfonal or the like; a polyacetylene; a polydiacetylene; a polythiazyl; a polyselenophene; a polyfuran; a polytellurophene; a polyazulene; a polyindene; and a polyparaphenylene.

(iv) The fourth type is a polymer capable of conducting an oxidation-reduction reaction by doping/dedoping of cation and doping/dedoping of proton. There can be mentioned, for example, a polynaphthylene, a polyanthracene, a polypyridine, a polypyrimidine, a polybipyridine, a polyquinoxaline and a polydiaminoanthraquinone.

These polymers differ in potential at which they give rise to an oxidation-reduction reaction. Therefore, the polymer active material is appropriately selected from them depending upon the battery voltage desired or the reaction potentials of the positive electrode and negative electrode used in combination.

There is no particular restriction as to the method for producing the polymer active material; however, there can be used known methods such as electrolytic oxidative polymerization, chemical oxidative polymerization, condensation and the like.

The plasticizer used in the present invention can be a compound capable of imparting plasticity to the polymer active material and enhancing its flexibility and processability. In the present invention, use of a plasticizer can greatly enhance, in particular, the moldability in hot pressing which is described later. The plasticizer is preferably an organic solvent having a boiling point of 200° C. or more and a vapor pressure of 5 mmHg or less at 85° C. As specific examples, there can be mentioned dibutyl phthalate, butyl butylphthalylglycolate, di-2-ethylhexyl phthalate, diisoheptyl phthalate, diisobutyl phthalate, diethylhexyl adipate, diethylhexyl sebacate, trioctyl trimellitate, tricresyl phosphate, triphenyl phosphate, methyl acetylricinolate, epoxyalkyl stearate, epoxytriglyceride, octyl epoxidized tetrahydrophthalate, chlorinated paraffin, chlorinated diphenyl and chlorinated polyethylene. Of these, particularly preferred are dibutyl phthalate, butyl butylphthalylglycolate, diethylhexyl adipate and trioctyl trimellitate. These plasticizers may be used in combination of two or more kinds.

The conductivity-enhancing agent used in the present invention can be a conductivity-enhancing agent generally used as a battery material. As specific examples, there can be mentioned a powder of conductive carbon such as acetylene black, Ketjen Black, aniline black, vapor phase-grown carbon, graphite, active carbon or the like; a sintered carbon powder or fiber obtained by sintering and carbonizing a polyacrylonitrile, a polyimide, a pitch, a cellulose, a phenolic resin or the like; a powder or fiber of a metal such as nickel, gold, silver, copper, tin, stainless steel, aluminum, tantalum, niobium, tungsten, titanium or the like; and a powder or fiber of a conductive polymer such as polyaniline, polythiophene, polypyrrole, polyphenylenevinylene, polyphenylacetylene, polyacetylene or the like. Preferably, an agent neither soluble in nor corroded by the electrolytic solution (described later) is appropriately selected from the above agents and used.

The conductivity-enhancing agent has no particular restriction as to the shape as long as it has a shape ordinarily possessed by such agents. The shape can be, for example, particles having a particle diameter (in terms of the three-dimensionally largest diameter) of about 20 $\mu$m or less, preferably about 5 $\mu$m or less, or a fiber having a diameter of 0.01 to 10 $\mu$m and a length of about 0.5 to 100 $\mu$m.

In the present invention, the amount of the plasticizer is preferably 2 to 15% by weight relative to the total weight of the polymer active material, the conductivity-enhancing agent and the plasticizer. In general, when the amount of the plasticizer is increased, improved moldability is obtained, molding in hot press becomes easy as mentioned later, and cracking or chipping of electrode takes place hardly. Consequently, low-temperature molding becomes possible and it is possible to mold at a temperature distinctly lower than the thermal decomposition temperature of the polymer; therefore, for example, scission of polymer main chain does not take place and electrical activity can be maintained. The amount of the plasticizer is particularly preferably 5% by weight or more in view of the moldability of electrode. Meanwhile, since the plasticizer is substantially an insulating material, the amount thereof is preferably 10% by weight or less in view of the energy density and power density of electrode.

The weight ratio of the polymer active material and the conductivity-enhancing agent is preferably 50:50 to 90:10, particularly preferably 75:25 to 90:10.

Next, description is made on the method for producing a molded electrode according to the present invention.

In the present method for producing a molded electrode, an electrode material containing a polymer active material, a conductivity-enhancing agent and a plasticizer is prepared by mixing (this electrode material is hereinafter referred to as electrode mixture). The electrode mixture is subjected to hot pressing, together with one or more current collector sheets.

Preferably, the polymer active material used in mixing is beforehand ground into an average particle diameter of 20 mesh or less, particularly 60 mesh or less using, for example, an agate mortar or an analytical mill.

Mixing of the ground polymer active material, the conductivity-enhancing agent and the plasticizer may be conducted by any method. For example, a plasticizer may be added to a powdery polymer active material and a conductivity-enhancing agent, followed by mixing; or, thorough mixing may be conducted using an appropriate solvent for easier mixing and dispersion, followed by removal of the solvent by, for example, drying.

In molding the above-obtained electrode mixture and a current collector sheet into one piece, pressing using a die such as mold or the like is preferred. The die is preferably made of stainless steel, ultrahigh strength steel or the like in view of the shape and dimensional stability required at high temperatures. A molded electrode of desired shape can be obtained by appropriately selecting the die shape. For example, by using a die having unevenness at the surface, a molded electrode having unevenness at the surface of the electrode material can be obtained.

In forming a molded electrode having a structure shown in FIG. 1, a current collector sheet is placed in a die; an electrode mixture is filled thereon; an upper die for pressurization is placed thereon; and a pressure of, for example, 40 to 200 kgf/cm$^2$ is applied and heating is conducted at, for example, 150 to 300° C. There is no particular restriction as to the method for pressurization and heating. The polymer active material powder in the electrode mixture melts easily owing to the presence of a plasticizer in the molded electrode. After cooling, a one-piece molded electrode in which the polymer active material containing a conductivity-enhancing agent adheres to the current collector sheet, is taken out of the die.

The molding conditions such as applied pressure, applied temperature and the like can be appropriately changed depending upon the kind, properties (e.g. polymerization degree), etc. of the polymer active material used, the shape and dimension of the molded electrode desired, the heat capacity of the die used, etc. However, the molding conditions are appropriately selected in the above-shown ranges so that the polymer active material is not adversely affected. The molding time can also be set appropriately.

In forming a molded electrode having a structure shown in FIG. 2, an electrode mixture is filled into a die in two portions so that a current collector sheet is interposed between the two portions, after which hot pressing is conducted once to obtain a molded electrode. Or, a molded electrode of FIG. 1 is obtained; then, it is placed in a die with the side of the current collector not covered with the electrode mixture, being directed upward; a fresh electrode mixture is placed on the side; and the resulting combination is subjected to hot pressing. Or, a molded material is formed using only an electrode mixture; this molded material is placed on a molded electrode of FIG. 1 at the side of the current collector not covered with the electrode mixture; and the resulting combination is subjected to hot pressing.

In forming a molded electrode shown in FIG. 3 in which a plurality of current collector sheets and an electrode mixture are molded into one piece, hot pressing may be conducted once as mentioned above to mold into one-piece. Or, firstly, a molded electrode of FIG. 1 is formed; then, in the same die, a current collector sheet is placed on the solidified electrode mixture of the molded electrode and a fresh electrode mixture powder is placed thereon; hot pressing is conducted to obtain a molded electrode containing two current collector sheets; and this operation is repeated necessary times to obtain a molded electrode containing a desired number of current collector sheets. Or, a plurality of molded electrodes of FIG. 1 are formed, then laminated on each other, and subjected to hot pressing.

The molded electrode formed by the above method has a porosity of, for example, about 20 to 30% in volume, is in a state of relatively high density packing, and has such a relatively high hardness as regarded as a so-called molded plastic.

In the secondary battery of the present invention, such a molded electrode is used as at least either of the positive electrode and the negative electrode. For which electrode the molded electrode is used, is determined depending upon, for example, the kind of the polymer active material used in the molded electrode and its combination with the electrolytic solution and the opposite electrode.

The secondary battery of the present invention is obtained by laminating a positive electrode and a negative electrode with interposing a separator between them for prevention of short circuiting between the two electrodes, and allowing the resulting laminate to hold an appropriate electrolytic solution, and accommodating them in an appropriate vessel. Alternately, a solid electrolyte may be used in place of the separator.

The electrolytic solution used in the secondary battery of the present invention is classified as follows and each type includes the following solutions.

As a non-aqueous electrolytic solution, there can be mentioned those obtained by dissolving, in a solvent of high polarity, an electrolyte such as $LiPF_6$, $LiSbF_4$, $LiAsF_6$, $LiBF_6$, $LiClO_6$, $LiCF_3SO_3$, $LiI$, $KPF_6$, $KClO_4$, n-(Bu)$_4NBF_4$, n-(Bu)$_4NClO_4$, $LiAlCl_4$ or the like. Specific examples of the solvent are propylene carbonate, ethylene carbonate, benzonitrile, acetonitrile, tetrahydrofuran, 2-methyltetrahydrofuran, γ-butyrolactone, dioxolan, triethyl phosphite, dimethylformamide, dimethylacetamide, dimethyl sulfoxide, dioxane, dimethoxyethane, polyethylene glycol, sulfolane, dichloroethane, chlorobenzene, nitrobenzene and diethyl carbonate. These solvents can be used in admixture of two or more kinds.

As a neutral electrolytic solution, there can be used, for example, an aqueous solution of a metal sulfate such as copper sulfate, zinc sulfate or the like, or an aqueous solution of a metal chloride such as copper chloride, zinc chloride or the like.

As a proton-based electrolytic solution, there can be used an aqueous solution of sulfuric acid, phosphoric acid or hydrochloric acid, or a non-aqueous solution containing a proton source such as $HBF_4$, $HPF_6$, $HClO_4$, $HAlO_4$ or the like. As the specific solvent used in the non-aqueous solution, there can be mentioned, for example, propylene carbonate, ethylene carbonate, benzonitrile, acetonitrile, tetrahydrofuran, 2-methyltetrahydrofuran, γ-butyrolactone, dioxolan, triethyl phosphite, dimethylformamide, dimethylacetamide, dimethyl sulfoxide, dioxane, dimethoxyethane, polyethylene glycol, sulfolane, dichloroethane, chlorobenzene, nitrobenzene and diethyl carbonate. These solvents can be used in admixture of two or more kinds.

When there is utilized an oxidation-reduction reaction by doping/dedoping of proton which is a function of the polymer active material, proton must be present in the electrolytic solution and accordingly the above-mentioned proton-based electrolytic solution is used. An acidic aqueous solution is used generally. However, a non-aqueous solution containing a proton source such as $HBF_4$, $HPF_6$, $HClO_4$, $HAlO_4$ or the like can also be used.

When there is utilized the doping/dedoping of cation or anion by the polymer active material, a reaction is possible if an anion or cation is present in the electrolytic solution and, therefore, any of the above-mentioned non-aqueous electrolytic solution, neutral electrolytic solution and proton-based electrolytic solution is usable in many cases.

As the separator, a material is used which has permeability to the ion of electrolytic solution and which is superior in liquid holdability. There can be mentioned, for example, a glass fiber filter; a pore filter non-woven fabric or porous stretched material of a polymer such as polyester, teflon, polyflon, polyethylene, polypropylene or the like; and a non-woven fabric or porous stretched material consisting of a glass fiber and the above polymer.

With respect to the solid electrolyte used in place of the separator, there can be mentioned, as the non-aqueous solid electrolyte, an inorganic material such as metal halide (e.g. AgCl, AgBr, AgI or LiI), $RbAg_4I_5$, $RbAg_{41}CN$ or the like; a polymer/electrolyte composite obtained by dissolving the above-mentioned electrolyte salt in a polymer matrix such as polyethylene oxide, polypropylene oxide, polyvinylidene fluoride, polyacrylamide or the like; a gel-like crosslinked material thereof; and a gel-like polymer solid electrolyte obtained by dissolving the above-mentioned electrolytic solution in the above-mentioned polymer matrix.

As the proton-conducting solid electrolyte, there can be mentioned, for example, a polystyrenesulfonic acid, a polyvinylsulfonic acid, a polyarylsulfonic acid, a polyacrylsulfonic acid and a polyacrylic acid. There can also be used a mixture of a polar polymer (e.g. a polyacrylamide, a polyethyleneimine, a polyvinyl alcohol or a polyethylene oxide) and an inorganic acid (e.g. sulfuric acid, phosphoric acid or hydrochloric-acid).

EXAMPLES

Next, the present invention is described in more detail below by way of Examples.

Example 1

In this Example, a current collector sheet and an electrode material were hot-pressed into a one-piece molded electrode having a structure of FIG. 1; and a battery was constituted using the molded electrode as the positive electrode.

Production of Battery of Example 1

First, description is made on production of a battery in the following (1) to (4).

(1) Production of Positive Electrode Mixture

An aqueous solution of 1 M ammonium peroxodisulfate and an aqueous solution of 1 M of an aniline monomer were mixed with stirring at room temperature for 3 hours to allow a polymerization reaction to proceed slowly. The polymerization reaction product obtained was ground to 60 mesh or below using an agate mortar. Thereto was added an aqueous solution of 1 M of paratoluenesulfonic acid. The mixture was stirred at 65° C. for 12 hours to dope the polyaniline (PAn) with a paratoluenesulfonic acid anion (pTOS$^-$), whereby a PAn/pTOS$^-$ powder having conductivity was obtained.

There were mixed the above powder (80% by weight), a vapor phase-grown carbon (10% by weight) as a conductivity-enhancing agent and butyl butylphthalylglycolate (10% by weight) as a plasticizer. To the mixture was added an appropriate amount of N-methyl-2-pyrrolidone as a solvent, and the resulting mixture was a kneaded sufficiently and then dried at 150° C. for 30 minutes to evaporate the solvent. The resulting material was placed in an agate mortar and ground to obtain a powdery electrode mixture consisting of a PAn/pTOS$^-$ powder, a vapor phase-grown carbon and butyl butylphthalylglycolate.

(2) Placement of Current Collector in Molding Die

There was prepared, as a die for electrode molding, a stainless steel die having a hollow portion of 3 cm (width), 6 cm (length) and 1 cm (depth). Inside this die was placed a nickel foil of 50 μm (thickness), 3 cm (width) and 6 cm (length) to be used as a current collector. The surface of the nickel foil had beforehand been roughened by sandblasting.

(3) Filling of Electrode Mixture and Hot Press Molding

A rectangular stainless steel block of 1 cm (thickness), 1 cm (length) and 3 cm (width) was placed on one end (of lengthwise direction) of the current collector placed in the die, to mask the end. (This masked portion is later used as a terminal because no electrode material is formed thereon.)

Then, 3.9 g of the electrode mixture powder produced in the above (1) was uniformly filled on the current collector placed in the die; the current-collector and the electrode mixture were hot-pressed under the conditions of temperature of 200° C., at pressure of 100 kgf/cm$^2$ for 30 minutes using a rectangular pressing die of 3 cm (width), 5 cm (length) and 5 cm (thickness); thereby, a one-piece molded electrode 11 consisting of a nickel current collector 9 and an electrode material 10 was obtained. The electrode obtained had a thickness of 3 mm (this does not contain the thickness of the current collector), a length of 5 cm, a width of 3 cm and a density of 0.87 g/cm$^3$. Therefore, in the molded electrode, the ratio of electrode material volume to current collector volume (excluding the terminal portion) was 60:1.

(4) Production of Battery

Figure 5:
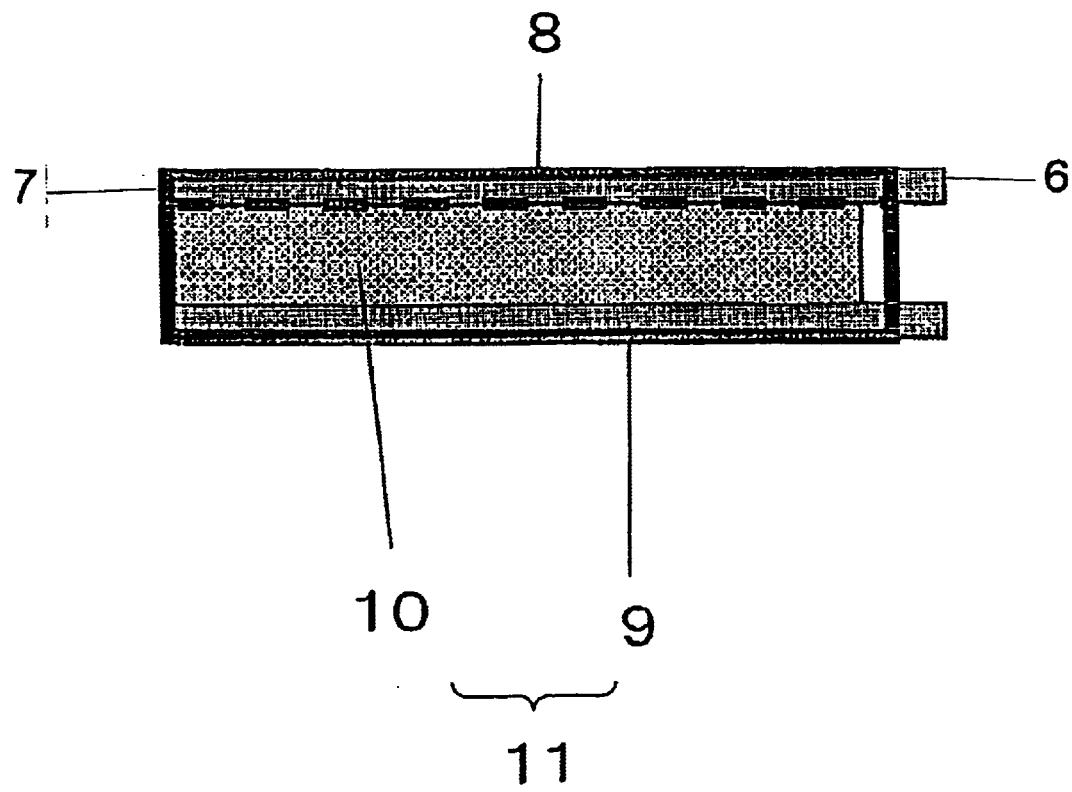
FIG. 5 is a sectional view showing the inside structure of an example of the battery of the present invention.

A battery shown in FIG. 5 was produced as follows, using, as the positive electrode, the one-piece molded electrode 11 consisting of a nickel current collector 9 and an electrode material 10, produced in the above (3) and, as the negative electrode, a lithium metal foil 6 of 200 μm (thickness), 3 cm (width) and 5 cm (length).

First, as a film for use as a casing member 8 to be formed later, there was prepared a laminated film of 100 μm in thickness, having a three-layered structure consisting of a polyethylene layer, an aluminum layer and a polypropylene layer. The laminated film was processed into a rectangular shape of 6 cm (length) and 4 cm (width). Two such rectangular materials were allowed to face each other at the polypropylene layers and heat sealed to each other at their three sides (6 cm, 4 cm, 6 cm) (the three sides were fusion-bonded in a width of 5 mm), to form a bag.

In this bag were placed the above-mentioned positive electrode and the negative electrode so as to face each other via a polypropylene-made porous separator 7 of 25 μm in thickness. In this case, part of the nickel current collector 9, having no electrode material thereon and part of the lithium metal foil 6 were allowed to project from the bag as a positive electrode terminal and a negative electrode terminal, respectively.

The resulting material was placed in a vacuum chamber and kept in a vacuum of 10 mmHg for 10 minutes; then, a mixed solvent of propylene carbonate and dimethoxyethane containing 1 M of lithium hexafluorophosphate (LiPF$_6$) as a supporting salt was injected into the material; the opening of the bag was thermally sealed under vacuum to form a casing member 8; thus, a bag was completed. In this Figure, the electrolytic solution is not shown.

Properties of Battery of Example 1

Figure 6:
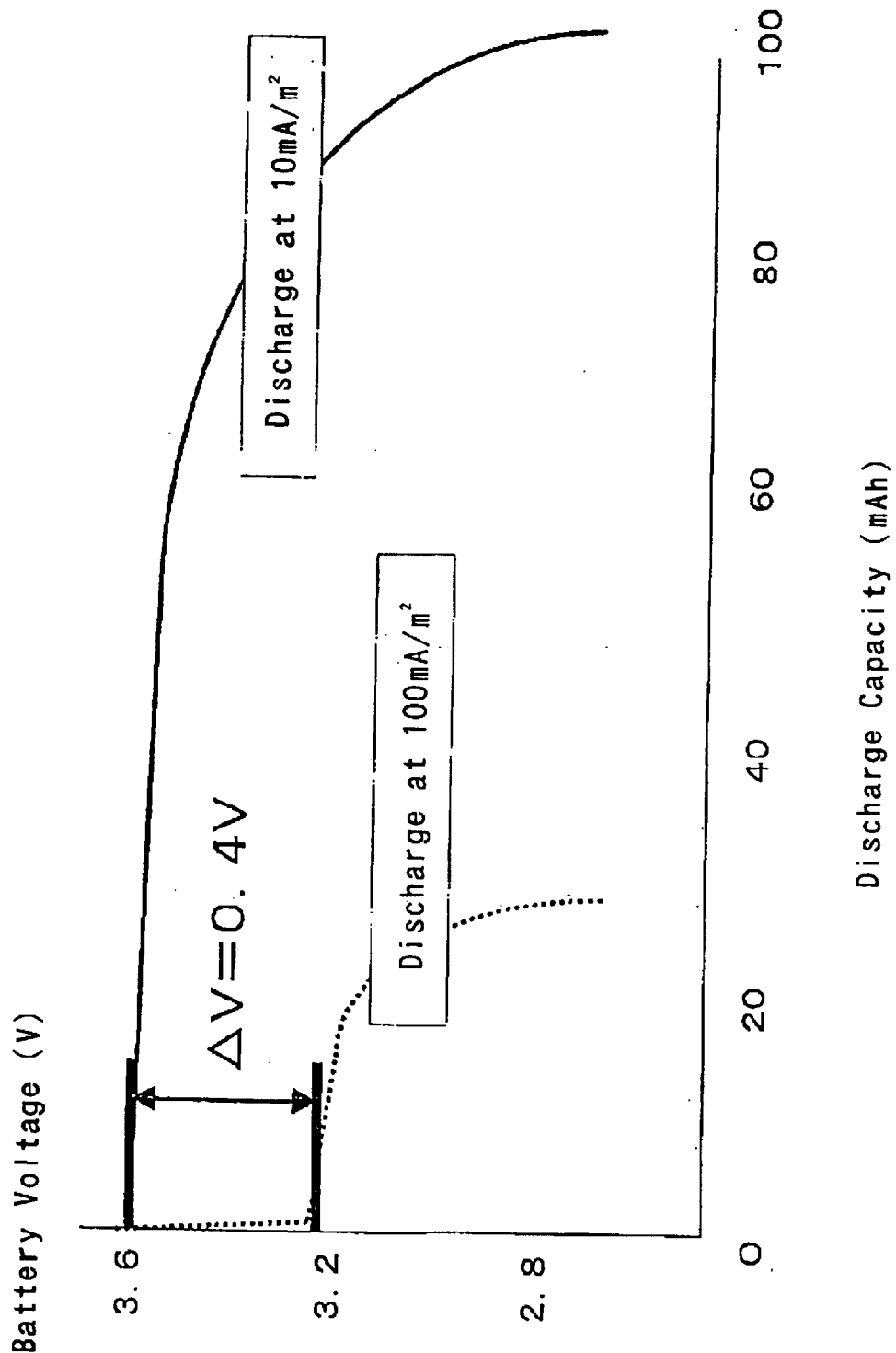
FIG. 6 is a graph showing the discharge characteristic of the battery of Example 1 of the present invention (ordinate= voltage, abscissa=discharge capacity).

The above-produced battery was measured for properties. The battery element produced was charged to 3.6 V at a constant current of 10 mA per cm$^2$ of electrode and then discharged to 2.8 V at a constant current of 10 mA or 100 mA per cm$^2$ of electrode. The discharge characteristic (voltage vs. capacity curve) is shown in FIG. 6.

In order to calculate a energy density per volume, the battery was measured for cell volume, which was 6.3 cm$^3$.

Incidentally, in the electrode reaction of the present Example, doping of PF$_6^-$ anion into positive electrode material (polyaniline) from electrolytic solution and deposition of lithium metal on negative electrode (metal lithium) from electrolytic solution take place during charge; during discharge, dedoping of PF$_6^-$ anion into electrolytic solution from positive electrode material (polyaniline) and dissolution of lithium ion into electrolytic solution from negative electrode (metal lithium) take place.

(1) Calculation of Energy Density

The energy density of a battery generally differs depending upon the level of the discharge current of the battery. Therefore, when the energy densities of various batteries are compared, it is necessary to compare their capacities in discharge at a given current. Herein, capacity was measured at a discharge current of 10 mA/cm$^2$ or 100 mA/cm$^2$, and energy density was calculated.

The capacity obtained was 182.5 mAh during discharge at 10 mA/cm$^2$ and 64 mAh during discharge at 100 mA/cm$^2$. These values were divided by the volume of the battery (cell) to determine a capacity per unit battery volume, which was 29.0 mAh/cm$^3$ during discharge at 10 mA/cm$^2$ and 10.2 mAh/cm$^3$ during discharge at 100 mA/cm$^2$.

Next, in order to calculate energy density, the average voltage during discharge at 10 mA/cm$^2$ or 100 mA/cm$^2$ was read from FIG. 6, which was 3.5 V or 3.1 V. Then, the product of this average voltage and the capacity per unit battery volume was calculated to use as energy density. As a result, the energy density of the battery of Example 1 was 101.5 mWh/cm$^3$ during discharge at 10 mA/cm$^2$ and 31.6 mWh/cm$^3$ during discharge at 100 mA/cm$^2$. Thus, the energy density of a battery generally differs depending upon the level of the discharge current of the battery, and a smaller discharge current gives a larger energy density. Energy density need be mentioned together with the discharge current employed; in the present invention, therefore, "energy density" refers to an energy density during discharge at 10 mA/cm², unless otherwise specified.

As above, the energy density of the battery of Example 1 is 101.5 mWh/cm³ and, as compared with 32.5 mWh/cm³ which is the energy density of the battery of Comparative Example 1 described later, is more than 3 times. This is because the positive electrode used in the present Example, as compared with that of Comparative Example 1, is thick and dense and a large amount of an active material is filled in the present battery cell.

(2) Internal Impedance

The power density of a battery is an important property of the battery, similarly to the energy density. The power density is affected mainly by the internal impedance of the battery, and a smaller internal impedance gives a battery of higher power density. Therefore, the internal impedance can be used as an indicator for power density. In FIG. 6, the initial voltage drop ($\Delta V$) is owing to the internal impedance (Z) of the battery produced and is represented as follows.

$$\Delta V = I \times Z$$

Using the above formula, the internal impedance (Z) of the present battery was calculated. That is, in FIG. 6, $\Delta V$ is 0.4 V when the discharge current is 100 mA/cm² and, therefore, Z becomes 4.0 $\Omega$. The internal impedance can also be calculated from the initial voltage drop when the discharge current is 10 mA/cm²; in the present invention, however, the value calculated from the initial voltage drop when the discharge current was 100 mA/cm², was taken as internal impedance.

As above, the internal impedance of the battery of the present Example is 4.0 $\Omega$, and is smaller than 5.0 $\Omega$ of Comparative Example 1 despite that the electrode thickness of the battery of the present Example is 6 times that of Comparative Example 1.

(3) Ratio of Energy Density

A change in energy density when discharge current is changed, can be used as another indicator for power density. In the present invention, a ratio of energy density during discharge at 100 mA/cm² and energy density during discharge at 10 mA/cm² was calculated. It was previously described that energy density differs depending upon the level of discharge current. A smaller decrease in energy density when discharge current is increased, gives a battery of higher power density. That is, a battery of larger ratio of energy density can be regarded as a battery of higher power density.

Ratio of energy density=(energy density during discharge at 100 mA/cm²)/(energy density during discharge at 10 mA/cm²)

In Example 1, the ratio of energy density is 0.31 and is larger than 0.29 of Comparative Example 1. Thus, the power density (internal impedance and ratio of energy density) of Example 1 is superior to that of Comparative Example 1 despite that the electrode thickness of Example 1 is 6 times that of Comparative Example 1. It is because, in Example 1, one-piece molding of positive electrode material and current collector by hot pressing gives an increased contact area between positive electrode material and current collector (nickel foil) and a decreased contact resistance between positive electrode material and current collector.

Example 2

In Example 2, hot pressing for one-piece molding of current collector and electrode material was conducted 3 times to produce a molded electrode having 3 current collector sheets in the thickness direction. A battery was constituted by using the molded electrode as a positive electrode.

First, a one-piece molded positive electrode consisting of an electrode material and a current collector was formed using the same electrode material and same manner as in Example 1. With this one-piece electrode being left in the die used, the same nickel current collector as used in Example 1 was placed in the die. Then, the same positive electrode mixture as used in Example 1 was filled uniformly, and hot pressing was conducted under the same conditions as in Example 1. This operation was conducted once more to obtain a one-piece molded electrode containing three current collectors. Then, the terminal portions of the nickel current collectors were welded to form one terminal for positive electrode.

The thus-obtained molded electrode had a thickness of 9 mm (excluding the thicknesses of the three current collectors), a length of 5 cm, a width of 3 cm and a density of 0.87 g/cm³. In the molded electrode, the ratio of electrode material volume and current collector volume was 60:1 (same as in Example 1).

A battery was produced by using the above positive electrode and the same negative electrode (lithium metal foil), etc. as in Example 1. The battery had a volume of 15.3 cm³. The properties of the battery were measured in the same manner as in Example 1. The results were as follows.

(1) Capacity
 During discharge at 10 mA/cm²: 574 mAh
 During discharge at 100 mA/cm²: 372 mAh
(2) Capacity Per Battery Volume
 During discharge at 10 mA/cm²: 37.5 mAh/cm³
 During discharge at 100 mA/cm²: 24.3 mAh/cm³
(3) Energy Density
 During discharge at 10 mA/cm²: 116.2 mWh/cm³
 During discharge at 100 mA/cm²: 75.2 mWh/cm³
(4) Internal Impedance
 2.0 $\Omega$
(5) Ratio of Energy Density
 0.64

In Example 2, the positive electrode has a thickness of 9 mm, which is 3 times that of Example 1 and even 18 times that of Comparative Example 1 and, as compared with Comparative Example 2, has a high density and a large thickness. Therefore, the amount of positive electrode active material in battery is large and consequently the battery has a very high energy density. Further, the battery has a small internal impedance and a high power density for the same reason as mentioned for the battery of Example 1.

Also in Example 2, by using a plurality of current collectors in the electrode, the distance between current collector and electrode active material can be kept at a certain level although the electrode thickness is large. That is, in a molded electrode using a single current collector as in Example 1, an increase in electrode thickness may result in an increased average distance between current collector and electrode active material; as a result, no electrons sufficient for electrode reaction may be fed from the current collector owing to the internal resistance of electrode per se, or no sufficient electrons reach the current collector from the electrode. In this Example, however, by using a plurality of current collectors in a one-piece molded electrode, a thick electrode can be obtained without increasing the average distance between current collector and electrode active material.

Thus, in the present method, a battery can be produced in a higher freedom of designing.

Example 3

The operation of Example 3 was the same as in Example 1 except that the positive electrode material was a polycyanoindole, the neutral electrolytic solution was an aqueous solution containing 1 M of zinc sulfate, and the negative electrode was metal zinc.

First, an ethanol solution of 1 M of iron sulfate and an aqueous solution of 1 M of cyanoindole were mixed with stirring at room temperature for 3 hours, to allow a polymerization reaction to proceed slowly. The polymerization product (a polycyanoindole) obtained by filtration and washing with DMF was ground to 60 mesh or below using an agate mortar. Since the polycyanoindole had been doped with sulfate ion during the polymerization reaction, no doping was applied to the polycyanoindole.

Using this polycyanoindole powder doped with sulfate ion and employing the same manner as in Example 1, a powdery electrode mixture was obtained which consisted of the polycyanoindole, a vapor phase-grown carbon and butyl butylphthalylglycolate.

Hot pressing was conducted using the above positive electrode mixture and employing the same manner as in Example 1, to obtain a 3 mm-thick one-piece molded electrode for positive electrode, containing a nickel current collector. The molded electrode had the same shape as that of Example 1.

A battery was produced in the same manner as in Example 1, using, as the electrolytic solution, an aqueous solution of 1 M of zinc sulfate and, as the negative electrode, a metal zinc sheet of 50 μm in thickness, 3 cm in width and 5 cm in length. The battery had a volume of 6.2 cm$^3$.

In the battery of Example 3, there take place, during charge, doping of sulfate ion into positive electrode active material (polycyanoindole) from electrolytic solution and precipitation of zinc ion in electrolytic solution, on negative electrode (metal zinc); during discharge, there take place dedoping of sulfate ion into electrolytic solution from positive electrode active material (polycyanoindole) and dissolution of zinc ion into electrolytic solution from negative electrode (metal zinc).

To measure the properties of the battery, constant-current charge at 10 mA per cm$^2$ of electrode was conducted up to 1.4 V, and constant-current discharge at 10 mA per cm$^2$ of electrode or 100 mA per cm$^2$ of electrode was conducted down to 0 V. The battery properties obtained were as follows.

(1) Capacity
  During discharge at 10 mA/cm$^2$: 202.8 mAh
  During discharge at 100 mA/cm$^2$: 174 mAh
(2) Capacity Per Battery Volume
  During discharge at 10 mA/cm$^2$: 32.7 mAh/cm$^3$
  During discharge at 100 mA/cm$^2$: 28.1 mAh/cm$^3$
(3) Energy Density
  During discharge at 10 mA/cm$^2$: 42.5 mWh/cm$^3$
  During discharge at 100 mA/cm$^2$: 33.7 mWh/cm$^3$
(4) Internal Impedance
  0.5 Ω
(5) Ratio of Energy Density
  0.79

In the battery of Example 3, as compared with the same type battery of Comparative Example 3 described later, the positive electrode has a 6-fold thickness and a high density; therefore, the battery has a high energy density. Further, the battery has a small internal impedance and a high power density for the same reason as mentioned for the battery of Example 1.

An aqueous electrolytic solution, as compared with an organic electrolytic solution, shows a large conductivity and gives a quick ion transport. Therefore, the battery of the present Example using a neutral aqueous electrolytic solution is superior in power density as compared with the batteries of Examples 1 and 2 and Comparative Examples 1 and 2.

Example 4

In this Example, a molded positive electrode having three current collector sheets in the thickness direction was prepared by using the same current collector and electrode material as in Example 3 and repeating hot pressing for one-piece molding three times in the same manner as in Example 2. The molded electrode had the same shape as in Example 2.

Using the above positive electrode and the same negative electrode and electrolytic solution as in Example 3, a battery was produced. The battery had a volume of 14.9 cm$^3$.

The battery was evaluated in the same manner as in Example 3. The results were as follows.

(1) Capacity
  During discharge at 10 mA/cm$^2$: 670 mAh
  During discharge at 100 mA/cm$^2$: 621 mAh
(2) Capacity Per Battery Volume
  During discharge at 10 mA/cm$^2$: 44.9 mAh/cm$^3$
  During discharge at 100 mA/cm$^2$: 41.6 mAh/cm$^3$
(3) Energy Density
  During discharge at 10 mA/cm$^2$: 58.4 mWh/cm$^3$
  During discharge at 100 mA/cm$^2$: 50.0 mWh/cm$^3$
(4) Internal Impedance
  0.3 Ω
(5) Ratio of Energy Density
  0.86

As compared with Comparative Example 4 described later, the molded positive electrode of Example 4 has an electrode of 6-fold thickness and the battery has a very large energy density. Further, the battery of Example 4 using a neutral electrolytic solution, similarly to the battery of Example 3, is superior in power density as compared with those of Examples 1 and 2 and Comparative Examples 1 and 2.

Example 5

In the battery of this Example, a molded electrode of the present invention was used as the positive electrode, and an electrode obtained by making a polymer active material into a film by a conventional method was used as the negative electrode.

That is, there was used, as the positive electrode, a one-piece molded electrode using a polycyanoindole as the electrode active material, obtained in the same manner as in Example 3 except that a tantalum foil of 50 μm in thickness was used as the current collector.

Meanwhile, a polyphenylquinoxaline electrode to be used as the negative electrode was produced as follows. 65% by weight of a polyphenylquinoxaline and 35% by weight of a vapor phase-grown carbon were sufficiently kneaded together with an appropriate amount of a solvent (N-methyl- 2-pyrrolidone) to obtain a paste. This paste was coated on a conductive rubber (100 μm in thickness, 3 cm in width and 6 cm in length) by a doctor blade method, to form a film of 3 cm in width and 5 cm in length. The film was dried at 125° C. for 30 minutes. The resulting electrode had a thickness of 1 mm and a density of 0.4 g/cm$^3$; however, it generated cracking on the electrode material during drying and showed chipping from the conductive rubber (current collector). Hence, a film of 500 μm in thickness was formed, whereby a negative electrode free from cracking or chipping from conductive rubber could be obtained. Therefore, this was used as a negative electrode. The electrode had a density of 0.42 g/cm$^3$.

Using the above positive electrode and negative electrode and an electrolytic solution (an aqueous solution of 2 M of sulfuric acid), a battery was produced in the same manner as in Example 1. The battery had a volume of 7.2 cm$^3$.

In the electrode reaction of this battery, there take place, during charge, doping of proton into polycyanoindole (positive electrode active material) from electrolytic solution and release of proton into electrolytic solution from negative electrode polyphenylquinoxaline and, during discharge, dedoping of proton into electrolytic solution from polycyanoindole (positive electrode active material) and proton adsorption by negative electrode polyphenylquinoxaline from electrolytic solution.

To measure the properties of the battery, constant-current charge at 10 mA per cm$^2$ of electrode was conducted up to 1.3 V, and constant-current discharge at 10 mA per cm$^2$ of electrode or 100 mA per cm$^2$ of electrode was conducted down to 0 V. The battery properties obtained were as follows.

(1) Capacity
  During discharge at 10 mA/cm$^2$: 98 mAh
  During discharge at 100 mA/cm$^2$: 84 mAh
(2) Capacity Per Battery Volume
  During discharge at 10 mA/cm$^2$: 13.6 mAh/cm$^3$
  During discharge at 100 mA/cm$^2$: 11.7 mAh/cm$^3$
(3) Energy Density
  During discharge at 10 mA/cm$^2$: 16.3 mWh/cm$^3$
  During discharge at 100 mA/cm$^2$: 13.5 mWh/cm$^3$
(4) Internal Impedance
  0.1 Ω

In Example 5, the positive electrode has a high density as compared with comparative Example of the same type battery, but the negative electrode is produced by a conventional technique; therefore, the battery has about the same capacity as Comparative Example 5. In general, battery capacity is restricted by either of positive electrode capacity and negative electrode capacity. In Example 5, the positive electrode has a sufficient capacity but the negative electrode has no capacity matching that of the positive electrode; therefore, the battery shows no sufficient capacity as a whole.

Meanwhile, with respect to the power density, the battery of Example 5 has a small internal impedance and can discharge a large current because the positive electrode has a one-piece molded structure obtained by hot pressing of electrode material and current collector.

Further, in the battery of Example 5, since it uses an acidic aqueous electrolytic solution, the two electrodes each give rise to an electrode reaction based on the oxidation-reduction reaction of proton and thereby charge-discharge takes place. Since the transport of proton in acidic aqueous solution is fast as compared the transport of other ions, the battery of Example 5 is superior in power density even to those of Examples 3 and 4 and Comparative Examples 3 and 4.

Example 6

In Example 6, molded electrodes were used for both the positive electrode and the negative electrode. The same molded electrode as used in Example 5 (current collector= tantalum foil of 50 μm, electrode active material= polycyanoindole) was used for the positive electrode, and the molded electrode for negative electrode was produced as follows. Other respects (e.g. electrolytic solution) were the same as in Example 5.

There were mixed a polyphenylquinoxaline powder (75% by weight), a vapor phase-grown carbon (15% by weight) as a conductivity-enhancing agent and butyl butylphthalylglycolate (10% by weight) as a plasticizer. To the mixture was added an appropriate amount of N-methyl-2-pyrrolidone as a solvent, and the resulting mixture was kneaded sufficiently and then dried at 150° C. for 30 minutes to evaporate the solvent. The resulting material was placed in an agate mortar and ground to obtain a powdery electrode mixture consisting of a polyphenylquinoxaline powder, a vapor phase-grown carbon and butyl butylphthalylglycolate.

3.7 g of this negative electrode mixture was uniformly filled in a die in which a tantalum foil as current collector had been placed. Hot pressing was conducted under the conditions of 200° C., 150 kgf/cm$^2$ and 30 minutes to obtain a one-piece molded negative electrode containing a current collector. The electrode had a thickness of 3 m and a density of 0.84 g/cm$^3$.

Using the above positive electrode and negative electrode and the same electrolytic solution as in Example 5, a battery was produced in the same manner as in Example 5. The battery had a volume of 0.8 cm$^3$. The electrode reactions of the battery of Example 6 are the same as in Example 5.

The battery was evaluated for properties in the same manner as in Example 5. The results were as follows.
(1) Capacity
  During discharge at 10 mA/cm$^2$: 601 mAh
  During discharge at 100 mA/cm$^2$: 594 mAh
(2) Capacity Per Battery Volume
  During discharge at 10 mA/cm$^2$: 55.6 mAh/cm$^3$
  During discharge at 100 mA/cm$^2$: 55.0 mAh/cm$^3$
(3) Energy Density
  During discharge at 10 mA/cm$^2$: 66.7 mWh/cm$^3$
  During discharge at 100 mA/cm$^2$: 63.3 mWh/cm$^3$
(4) Internal Impedance
  0.1 Ω
(5) Ratio of Energy Density
  0.94

The battery of Example 6 uses molded electrodes for both the positive electrode and the negative electrode. Therefore, as compared with Example 5, the negative electrode has a large density and a large thickness; consequently, the battery has a large energy density.

Further, the battery of Example 6 uses an acidic aqueous electrolytic solution and therefore shows an excellent power density for the same reason as mentioned for Example 5.

Example 7

In Example 7, a battery was produced in the same manner as in Example 6 except that a molded electrode having unevenness at the surface was used for the negative electrode. The negative electrode was molded as follows.

In the same procedure as in Example 1, a tantalum current collector was placed in a die, part of the current collector was masked by a stainless steel block, and 3.7 g of an electrode mixture powder was uniformly filled on the current collector in the die. Using a rectangular pressing die having, on the pressing surface, unevenness (grooves of 0.5 mm in width and 0.5 mm in depth) at intervals of 0.5 mm, hot pressing was conducted under the conditions of 200° C. (temperature), 100 kgf/cm² (pressure) and 30 minutes (time) to obtain a one-piece molded electrode consisting of a current collector and an electrode material.

The molded electrode had a thickness of 3 mm, a length of 5 cm, a width of 3 cm and a density of 0.87 g/cm³. On the surface, it uniformly had grooves of 0.5 mm in width and 0.5 mm in depth at intervals of 0.5 mm, correspondingly to the surface shape of the pressing die.

A battery was produced in the same manner as in Example 6. The battery had a volume of 10.6 cm³.

The properties of the battery were as follows.
(1) Capacity
   During discharge at 10 mA/cm²: 631 mAh
   During discharge at 100 mA/cm²: 634 mAh
(2) Capacity Per Battery Volume
   During discharge at 10 mA/cm²: 59.5 mAh/cm³
   During discharge at 100 mA/cm²: 59.8 mAh/cm³
(3) Energy Density
   During discharge at 10 mA/cm²: 71.4 mWh/cm³
   During discharge at 100 IA/cm²: 71.6 mwh/cm³
(4) Internal Impedance
   0.03 Ω
(5) Ratio of Energy Density In Example 7, since the electrode surface has unevenness, the contact area between electrode and electrolytic solution is large as compared with Example 6 and the ion transport between electrolytic solution and electrode active material is smooth. As a result, the ion resistance between electrolytic solution and electrode active material is small and the battery, as compared with that of Example 6, has a small internal impedance and a large power density.

Comparative Example 1

The battery of Comparative Example 1 had the same structure as that of Example 1 except that the positive electrode was not a molded electrode but a conventional electrode produced by a doctor blade method. The positive electrode was produced as follows.

A polyaniline powder (80% by weight) produced in the same manner as in Example 1 was mixed with a vapor phase-grown carbon (10% by weight) as a conductivity-enhancing agent and a polyvinylidene fluoride (10% by weight) as a binder. To the mixture was added an appropriate amount of N-methyl-2-pyrrolidone as a solvent. The resulting mixture was kneaded sufficiently to obtain a paste. The paste was coated on a nickel current collector by a doctor blade method in a film form, followed by drying at 120° C. for 15 minutes. In this case, the distance of the doctor blade was varied and the thickness of the positive electrode after drying was varied at intervals of 200 μm (the smallest thickness was 100 μm).

An increase in electrode thickness caused cracking of electrode during drying and chipping of electrode from current collector. This is disadvantageous for battery electrode. Meanwhile, a small electrode thickness gives an insufficient battery capacity. Hence, production of electrode was repeated so as to obtain an electrode having no cracking on the current collector and yet having the largest electrode thickness. As a result, it was found out that an electrode thickness of 700 μm or more causes cracking at the electrode surface, which is unsuitable for battery electrode. Thus, it was found out that the maximum electrode thickness safely obtainable by a conventional doctor blade method is 500 μm.

Therefore, the electrode material thickness of electrode formed by a doctor blade method was set at 500 μm in all cases.

Using the above positive electrode, a battery was produced in the same manner as in Example 1. The battery had a volume of 2.25 cm³. The properties of the battery were measured in the same manner as in Example 1. The results were as follows.
(1) Capacity
   During discharge at 10 mA/cm²: 21.0 mAh
   During discharge at 100 mA/cm²: 7.0 mAh
(2) Capacity Per Battery Volume
   During discharge at 10 mA/cm²: 9.3 mAh/cm³
   During discharge at 100 mA/cm²: 3.2 mAh/cm³
(3) Energy Density
   During discharge at 10 mA/cm²: 32.5 mWh/cm³
   During discharge at 100 mA/cm²: 9.6 mwh/cm³
(4) Internal Impedance
   5.0 Ω

Comparative Example 2

The positive electrode of Comparative Example 2 had the same structure as that of Example 2 except that a polyaniline was used as the positive electrode active material and three current collector sheets were inserted into the electrode by a conventional method (no hot pressing was used). The positive electrode was produced as follows.

A positive electrode was formed on a nickel current collector in the same manner as in Comparative Example 1; a nickel current collector was placed thereon; thereby, an electrode was produced. In this method, the first electrode and the second electrode were not made into one piece and two electrodes of the same structure as in Comparative Example 1 were obtained. Three electrodes of the same structure as in Comparative Example 1 were laminated; each part of the three nickel current collectors not covered by the electrode was welded to each other to use as a terminal; thus, a positive electrode was produced.

Then, a battery was produced in the same manner as in Example 2. The battery had a volume of 2.95 cm³. The properties of the battery were measured. The results were as follows.
(1) Capacity
   During discharge at 10 mA/cm²: 69.0 mAh
   During discharge at 100 mA/cm²: 21.1 mAh
(2) Capacity Per Battery Volume
   During discharge at 10 mA/cm²: 23.8 mAh/cm³
   During discharge at 100 mA/cm²: 7.2 mAh/cm³
(3) Energy Density
   During discharge at 10 mA/cm²: 83.3 mWh/cm³
   During discharge at 100 mA/cm²: 21.1 mwh/cm³
(4) Internal Impedance
   7.0 Ω

Comparative Example 3

A battery was produced in the same manner as in Example 3 except that a polycyanoindole was used as the positive electrode active material and the positive electrode was produced by a conventional doctor blade method (no hot pressing was used). The battery had a volume of 2.2 cm$^3$. The properties of the battery were as follows.

(1) Capacity

During discharge at 10 mA/cm$^2$: 43.1 mAh

During discharge at 100 mA/cm$^2$: 29.0 mAh (2) Capacity Per Battery Volume

During discharge at 10 mA/cm$^2$: 19.5 mAh/cm$^3$

During discharge at 100 mA/cm$^2$: 13.2 mAh/cm$^3$ (3) Energy Density

During discharge at 10 mA/cm$^2$: 25.4 mWh/cm$^3$

During discharge at 100 mA/cm$^2$: 14.5 mWh/cm$^3$ (4) Internal Impedance 2.0 Ω

Comparative Example 4

A battery was produced in the same manner as in Example 4 except that the positive electrode was produced by using a polycyanoindole as the electrode material and inserting three current collectors into the electrode by a conventional doctor blade method (no hot pressing was used). The battery had a volume of 3.08 cm$^3$. The properties of the battery were as follows.

(1) Capacity

During discharge at 10 mA/cm$^2$: 102 mAh

During discharge at 100 mA/cm$^2$: 71.2 mAh (2) Capacity Per Battery Volume

During discharge at 10 mA/cm$^2$: 33.1 mAh/cm$^3$

During discharge at 100 mA/cm$^2$: 23.1 mAh/cm$^3$ (3) Energy Density

During discharge at 10 mA/cm$^2$: 43.6 mWh/cm$^3$

During discharge at 100 mA/cm$^2$: 25.4 mWh/cm$^3$ (4) Internal Impedance 3.0 Ω

Comparative Example 5

A battery was produced in the same manner as in Example 5 except that even the positive electrode was produced by a conventional doctor method. That is, in Comparative Example 5, a battery was produced in which a polycyanoindole was used as the positive electrode active material and a polyphenylquinoxaline was used as the negative electrode active material, both the positive electrode and the negative electrode were produced by a doctor blade method, and an acidic aqueous solution was used as the electrolytic solution. The battery had a volume of 2.1 cm$^3$. The properties of the battery were as follows.

(1) Capacity

During discharge at 10 mA/cm$^2$: 21.4 mAh

During discharge at 100 mA/cm$^2$: 17.9 mAh (2) Capacity Per Battery Volume

During discharge at 10 mA/cm$^2$: 10.2 mAh/cm$^3$

During discharge at 100 mA/cm$^2$: 8.6 mAh/cm$^3$ (3) Energy Density

During discharge at 10 mA/cm$^2$: 12.0 mWh/cm$^3$

During discharge at 100 mA/cm$^2$: 9.5 mWh/cm$^3$ (4) Internal Impedance 0.7 Ω

The key properties of the batteries produced in the above Examples and Comparative Examples are shown in Table 1.

TABLE 1

| | Energy density (mWh/cm$^3$) | Ratio of energy density | Impedance (Ω) |
|---|---|---|---|
| Example 1 | 101.5 | 0.31 | 4.0 |
| Comparative Example 1 | 32.5 | 0.29 | 5.0 |
| Example 2 | 116.2 | 0.64 | 2.0 |
| Comparative Example 2 | 83.3 | 0.25 | 7.0 |
| Example 3 | 42.5 | 0.79 | 0.5 |
| Comparative Example 3 | 25.4 | 0.57 | 2.0 |
| Example 4 | 58.4 | 0.86 | 0.3 |
| Comparative Example 4 | 43.6 | 0.58 | 3.0 |
| Example 5 | 16.3 | 0.82 | 0.1 |
| Comparative Example 5 | 12.0 | 0.79 | 0.7 |
| Example 6 | 66.7 | 0.94 | 0.1 |
| Example 7 | 71.4 | 1.0 | 0.03 |

As described, the present invention provides a secondary battery using a polymer active material, which has a large energy density and a high power density and which has a high freedom in designing. The present invention further provides a method for producing a secondary battery of large energy density and high power density, using a polymer active material in a high freedom of designing.

What is claimed is:

1. A molded electrode, comprising:

an electrode material comprising a polymer active material, a conductivity-enhancing agent and a plasticizer; and a current collector sheet;

wherein the electrode material and the current collector sheet are molded into one piece, and the electrode material comprises a thickness of 300 μm to 9 mm and is formed on at least one side of the current collector sheet, and wherein said plasticizer comprises a material for facilitating molding of the molded electrode and enhancing the shape retainability after molding and is present when the molded electrode is in operation.

2. The molded electrode according to claim 1, wherein said electrode material includes a porosity of 20–30% in volume.

3. The electrode according to claim 1, wherein said current collector comprises a roughened surface.

4. The electrode according to claim 3, wherein said roughened surface comprises one of a sandblasted surface, a laser processed surface, a chemically etched surface and an electrochemically etched surface.

5. A molded electrode according to claim 1, wherein the amount of the plasticizer is 2 to 15% by weight of the total of the electrode material.

6. The molded electrode according to claim 1, wherein said electrode material comprises a thickness in a range of more than 500 μm to 9 mm.

7. The molded electrode according to claim 1, wherein said molded electrode is formed by using a press-pressure in a range between 40 kgf/cm$^2$ to 200 kgf/cm$^2$.

8. A molded electrode according to claim 1, wherein the electrode material has unevenness at the surface, said unevenly molded surface comprises a shape-retainable surface.

9. The molded electrode according to claim 1, wherein said surface of said electrode material is shaped to increase a surface area of said electrode material with substantially rectangular grooves.

10. The molded electrode according to claim 1, wherein said plasticizer comprises an organic solvent with a boiling point of at least 200° C. and a vapor pressure of no more than 5 mm Hg at 85° C.

11. The molded electrode according to claim 1, wherein said plasticizer comprises at least one of a dibutyl phthalate, butyl butylphthalylglycolate, diethylhexyl adipate and trioctyl trimellitate.

12. The molded electrode according to claim 1, wherein said polymer active material comprises at least one of an aniline, an aniline derivative, a pyrrole, a pyrrole derivative, a thiophene, a thiophene derivative, and polynaphthylene.

13. The molded electrode according to claim 1, wherein a weight ratio is in the range 50:50 to 90:10 of said polymer active material to said conductivity-enhancing agent.

14. A secondary battery comprising the molded electrode according to claim 1, wherein said molded electrode comprises at least one of a positive electrode and a negative electrode.

15. The secondary battery according to claim 14, further comprising:
an electrolytic solution situated around at least one of said positive electrode and said negative electrode.

16. The secondary battery according to claim 15, wherein said electrolytic solution comprises at least one of a non-aqueous electrolytic solution, a neutral electrolytic solution, a proton-based electrolytic solution and an acidic aqueous solution.

17. The molded electrode according to claim 1, wherein said conductivity-enhancing agent comprises particles with a diameter of no more than 20 µm.

18. The molded electrode according to claim 1, wherein said current collector sheet comprises a thickness no more than about 100 µm.

19. The molded electrode according to claim 1, wherein said current collector comprises at least one of a mesh structure and a metal foil.

20. The molded electrode according to claim 1, wherein a predetermined ratio exists between a volume of said electrode material to a volume of said current collector sheet.

21. The molded electrode according to claim 1, wherein said electrode material is hot pressed with said current collector sheet to form a heat bond between said electrode material and said current collector sheet.

22. A molded electrode comprising:
an electrode material comprising a polymer active material, a conductivity-enhancing agent and a plasticizer; and
at least one current collector sheet,
the electrode material and the current collector sheet being formed into one piece, and the ratio of the volume of the electrode material and the volume of the current collector sheet being within a range of 30:1 to 100:1, provided the volume of the terminal portion of the current collector sheet is excluded from the volume of the current collector sheet.

23. A molded electrode according to claim 22, wherein the current collector sheet comprises two or more current collector sheets.

24. A molded electrode according to claim 22, wherein the amount of the plasticizer is 2 to 15% by weight of the total of the electrode material.

25. A molded electrode according to claim 22, wherein the electrode material comprises an uneven surface.

26. A secondary battery comprising a molded electrode set forth in claim 22, as at least either of the positive electrode and the negative electrode.

27. A molded electrode comprising:
an electrode material comprising a polymer active material, a conductivity-enhancing agent and a plasticizer; and
a plurality of current collector sheets,
the electrode material and the current collector sheets being formed into one piece, and the current collector sheets being spaced from each other in the thickness direction of the electrode.

28. A molded electrode according to claim 27, wherein the amount of the plasticizer is 2 to 15% by weight of the total of the electrode material.

29. A molded electrode according to claim 27, wherein the electrode material comprises an uneven surface.

30. A secondary battery comprising a molded electrode as set forth in claim 27, as at least one of the positive electrode and the negative electrode.

31. The molded electrode according to claim 27, wherein a distance between adjacent ones of said current collector sheets is unequal.

* * * * *